United States Patent [19]
Sato et al.

[11] Patent Number: 5,384,834
[45] Date of Patent: Jan. 24, 1995

[54] TELEPHONE APPARATUS USING A DETACHABLE MEMORY DEVICE

[75] Inventors: Hiroshi Sato; Makoto Hoshino, both of Tokyo, Japan

[73] Assignee: Kabushiki Kaisha Toshiba, Kanagawa, Japan

[21] Appl. No.: 526,401

[22] Filed: May 21, 1990

[30] Foreign Application Priority Data

May 19, 1989 [JP] Japan .................. 1-126165

[51] Int. Cl.⁶ ............................................. H04R 25/00
[52] U.S. Cl. ........................................ 379/88; 379/67; 379/357
[58] Field of Search ................ 379/354, 355, 357, 67, 379/88, 91, 144; 235/380, 381; 395/2

[56] References Cited

U.S. PATENT DOCUMENTS

| | | | |
|---|---|---|---|
| 4,677,657 | 6/1987 | Nagata et al. | 379/357 |
| 4,680,785 | 7/1987 | Akiyama et al. | 379/357 |
| 4,759,056 | 7/1988 | Akiyama | 379/144 |
| 4,868,849 | 9/1989 | Tamaoki | 379/355 |
| 4,900,902 | 2/1990 | Sakakibara | 379/357 |
| 4,928,302 | 5/1990 | Kaneuchi et al. | 379/354 |
| 4,959,850 | 9/1990 | Marui | 379/58 |
| 4,961,212 | 10/1990 | Marui et al. | 379/354 |
| 4,961,229 | 10/1990 | Takahashi | 235/380 |
| 5,017,766 | 5/1991 | Tamada et al. | 235/380 |

FOREIGN PATENT DOCUMENTS

| | | | |
|---|---|---|---|
| 0042257 | 3/1982 | Japan | 379/357 |
| 0001136 | 1/1988 | Japan | 379/357 |
| 2-76441 | 3/1990 | Japan | 379/357 |
| 2225915 | 6/1990 | United Kingdom | 379/357 |

OTHER PUBLICATIONS

IEEE Standard Dictionary of Electrical and Electronic Terms, p. 921, Third Edition, Aug. 10, 1984.

*Primary Examiner*—Curtis Kuntz
*Assistant Examiner*—Huyen D. Le
*Attorney, Agent, or Firm*—Finnegan, Henderson, Farabow, Garrett & Dunner

[57] ABSTRACT

A telecommunication apparatus adapted to be used with a detachable memory device is disclosed. The detachable memory device such as an IC card are capable of storing information relating to a particular user. When the detachable memory device is connected to the apparatus, the apparatus retrieves information relating to the particular user out of the detachable memory device. Thereafter, the apparatus may perform one or more of functions on the basis of the retrieved information. When the detachable memory device is connected to the telecommunication apparatus, the apparatus detects the presence of identification information stored in the detachable memory device. In the event that the identification information is not detected, the apparatus provides an indication to a user so as to request the user to enter an identification information. After that, if an identification information is entered into the apparatus by the user, the entered identification number is sent to the detachable memory device and stored therein under the control of the apparatus. On the other hand, in the event that the identification information is detected, the apparatus provides an indication representative of the detected identification information to the user of the apparatus.

6 Claims, 7 Drawing Sheets

TELEPHONE APPARATUS USING A DETACHABLE MEMORY DEVICE

This application is related by subject matter to co-pending application Ser. No. 242,677 entitled TELEPHONE APPARATUS filed on Sep. 9, 1988.

FIELD OF INVENTION

This invention relates to the field of telecommunication apparatus for establishing communication link via a land line, a radio channel, or a combination thereof and, more particularly, to an improved telecommunication apparatus adapted to be used with one or more detachable memory devices such as IC cards.

BACKGROUND OF THE INVENTION

In recent years, by means of speech recognition function equipped in telephones, a call origination may be made in response to utterances of operators without manually dialing. Such function is called voice dial function or voice activated dialing. The voice dial function will be achieved by storing feature parameters of speech patterns associated with parties to be called and the corresponding telephone dial numbers in advance and by checking for a correspondence between the feature parameters of speech pattern of words uttered by a user at call origination and that of the stored speech patterns.

Since the speech recognition is performed on the basis of the feature parameters which are extracted from speech uttered by a particular user in a registration mode, speeches of other users may be misrecognized owing to mismatches of the feature parameters. Therefore, the particular user's speeches are once registered to a telephone, the speech recognition function of the telephone is available only for the particular user.

Similar deficiency of conventional telephones are also found in a repertory dialing function. According to the repertory dial function, a user may register some abbreviated numbers corresponding to telephone dial numbers and make a call only by pushing the abbreviated number. Such a repertory dialing function, however, is not available for the other users who don't know which abbreviated number corresponds to a telephone dial number.

SUMMARY OF THE INVENTION

It is accordingly an object of the present invention to provide an improved telecommunication apparatus which may be used with a detachable memory device, thereby personal information of a particular user, which is stored in the detachable memory device, is available to the apparatus.

It is a further object of the present invention to provide an improved telecommunication apparatus wherein a plurality of users may use the apparatus with their own information coupled.

It is still a further object of the present invention to provide an improved telecommunication apparatus wherein a user may identify a detachable memory device coupled to the apparatus.

In achieving these objects, the present invention includes a telecommunication apparatus adapted to be used with one or more detachable memory devices, each of which includes storing means for storing information relating to a particular user. The apparatus retrieves information out of the storing means when the detachable memory device is connected to the apparatus and performs one or more of functions on the basis of the retrieved information.

The problems and deficiencies of conventional telephone apparatus discussed above are solved by the principles of the present invention. In this invention, a detachable memory device such as an IC card capable of storing information is assigned to a particular user and the information relating to the particular user are stored in the detachable memory device. When the detachable memory device is connected to the telecommunication apparatus, retrieving means in the apparatus retrieves information relating to the particular user out of the storing means. Thereafter, the apparatus may perform one or more of functions on the basis of the retrieved information.

One of the performed functions may be a speech recognition function. In such a case, feature parameters extracted from a speech uttered by a particular user or data representative of the speech may be stored into the detachable memory device in a registration mode. When the detachable memory device is connected to the telephone apparatus and the apparatus is set to a speech recognition mode, a speech uttered by the particular user may be recognized on the basis of the feature parameters or the speech data stored in the detachable memory device. Accordingly, in the event that the result of the speech recognition is applied to the voice activated dialing, the dialing is accurately performed.

Another example of the functions may be a repertory dialing function. In this case, the detachable memory device stores one or more telephone dial numbers and one or more abbreviated number corresponding to the telephone dial numbers, which are entered in advance by a user holding the memory device. When the detachable memory device is connected to the telephone apparatus, the abbreviated numbers stored in the memory device become available to the user of the telephone apparatus. That is, the user may make a call only by pressing an abbreviated number.

In another aspect of the present invention, when the detachable memory device is connected to the telecommunication apparatus, the apparatus detects the presence of identification information stored in the detachable memory device. In the event that the identification information is not detected, the apparatus provides an indication to a user so as to request the user to enter an identification information. After that, if an identification information is entered into the apparatus by the user, the entered identification number is sent to the detachable memory device and stored therein under the control of the apparatus. On the other hand, in the event that the identification information is detected, the apparatus provides an indication representative of the detected identification information to the user of the apparatus. Accordingly, the user may identify what information is stored in the memory device or who the holder of the memory device is.

DESCRIPTION OF THE PREFERRED EMBODIMENT

A preferred embodiment of the present invention will be described with reference to the accompanying drawings.

Figure 1:
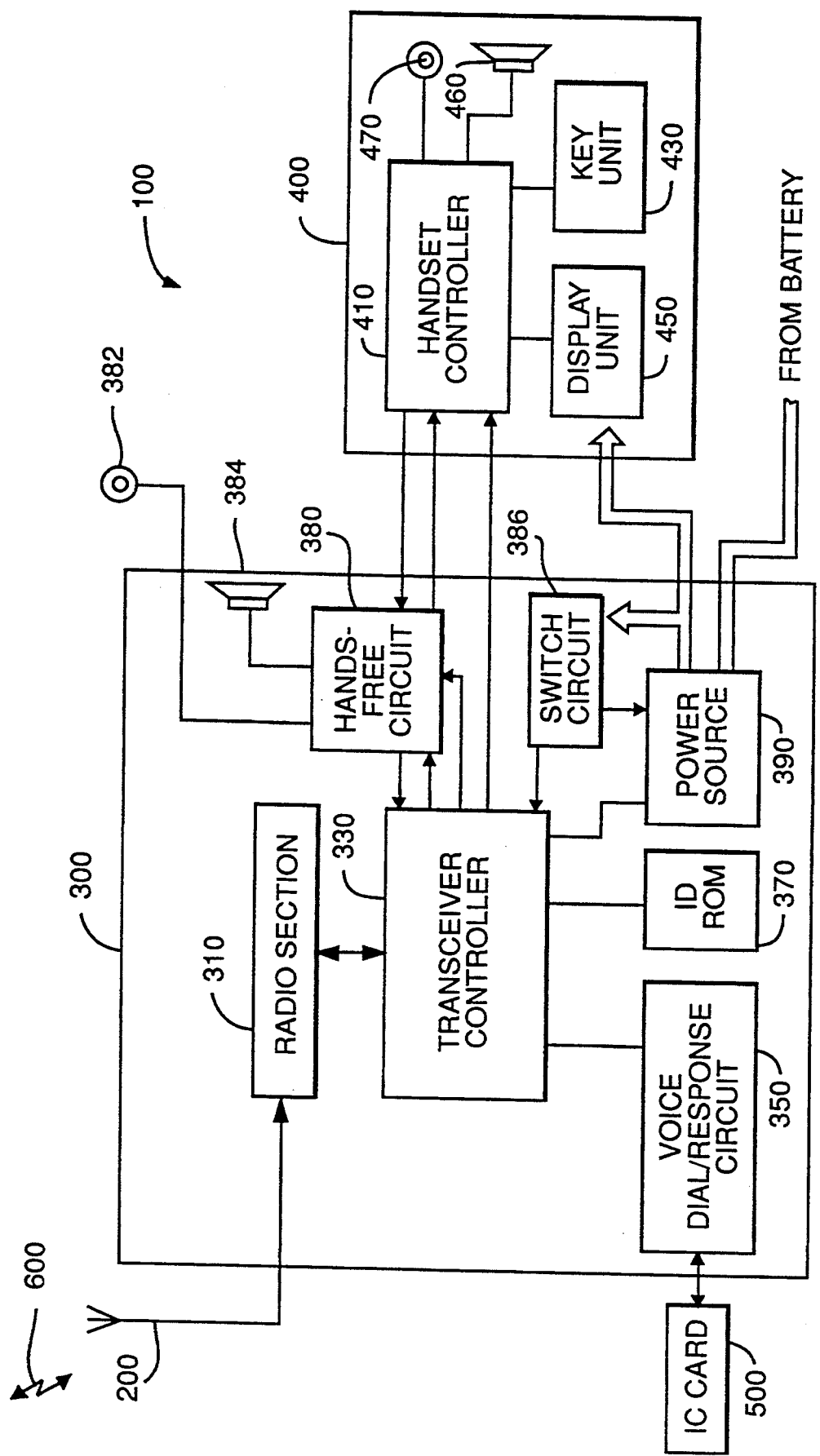
FIG. 1 is a block diagram of a mobile telephone apparatus according to an embodiment of the present invention.

FIG. 1 is a block diagram showing an arrangement of a mobile telephone apparatus according to an embodiment of the present invention.

Referring to FIG. 1, mobile telephone apparatus 100 comprises antenna 200, transceiver unit 300, and handset unit 400. The antenna 200 is mounted on an outer body surface of automobile. The transceiver unit 300 and the handset unit 400 are mounted near driver's seat as a telephone handset and a cradle receiving the handset.

Transceiver unit 300 mainly comprises radio section 310 for establishing radio link 600 with a base station (not shown) through antenna 200 and for exchanging signals therewith, transceiver controller 330 for controlling the overall operations of transceiver unit 300, voice dial/response circuit 350 for performing speech recognition and synthesis and for storing speech pattern signals, ID ROM 370 for storing ID (Identification Number) and telephone numbers, hands-free circuit 380 for hands-free operation by means of hands-free microphone 382 and loud speaker 384, switch circuit 386 including a hook off/on switch and power switch, and power source 390 for supplying power from battery (not shown) mounted in the automobile.

Handset unit 400 mainly comprises handset controller 410 for controlling the overall operations of handset unit 400 in response to an instruction or the like from transceiver controller 330, key unit 430 for entering key inputs, display unit 450 for providing visual display to operator, ear piece 460, and mouth piece 470. Hands-free microphone 382 may be mounted on sunvisor or the like near driver's seat.

The transceiver unit 300 constituting a cradle for handset controller 400 has an open receiving IC (Integrated Circuit) card 500.

Figure 2:
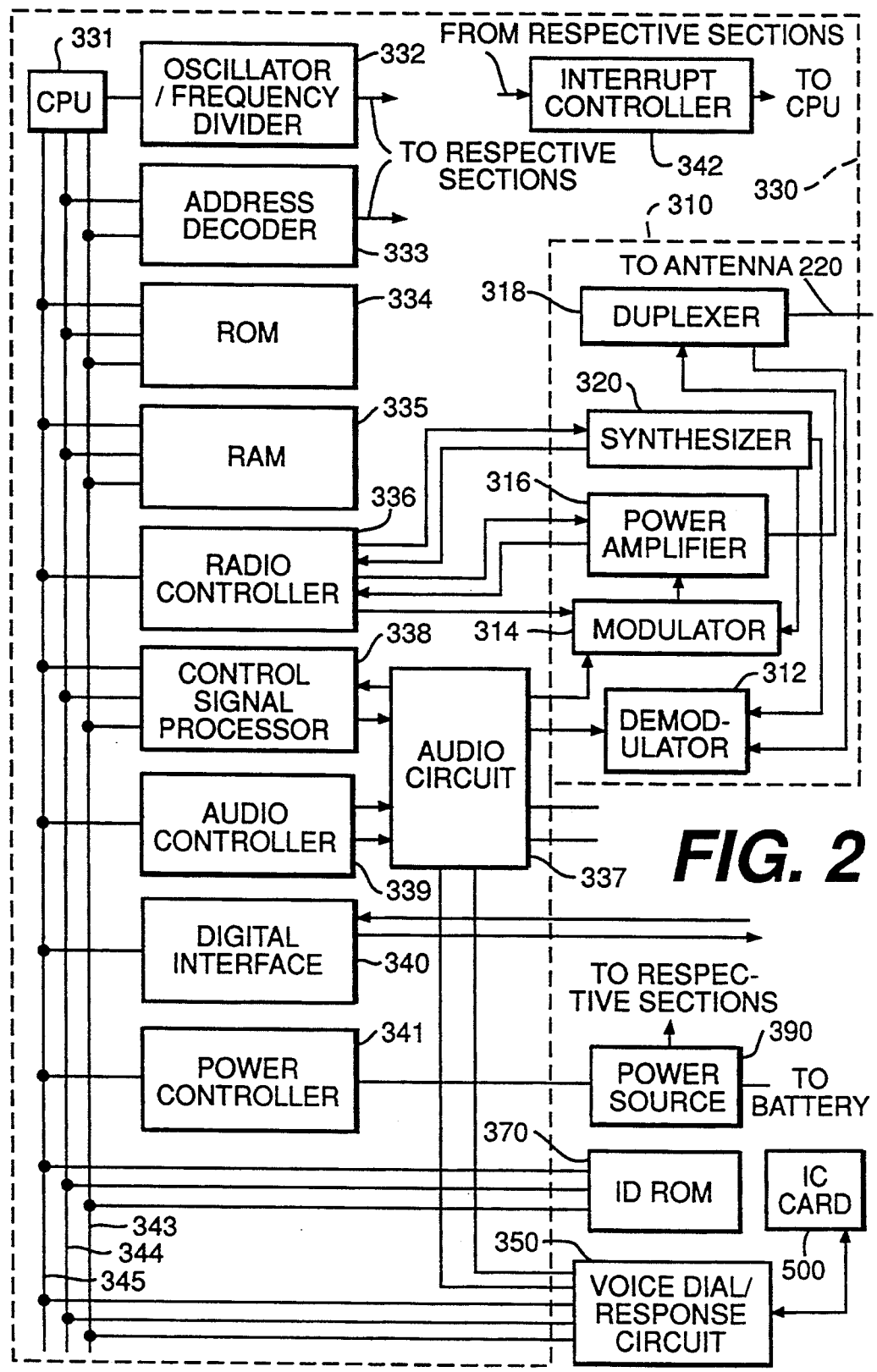
FIG. 2 is a block diagram of a radio section 310 and a transceiver controller 330 shown in FIG. 1.

FIG. 2 is a block diagram showing a detailed arrangement of the transceiver unit 330 described above.

Referring to FIG. 2, radio section 310 comprises demodulator 312, modulator 314, power amplifier 316, transmitter/receiver 318, and synthesizer 300. Demodulator 312 demodulates a radio signal received from the base station through radio channel 600, antenna 200, and transmitter/receiver 318. It should be noted that this signal includes audible sound signals and control signals. Modulator 314 modulates the audio and control signals and the like from audio controller 330 and generates transmission signals.

Power amplifier 316 amplifies the transmission signals from modulator 314. The amplification of power amplifier 316 is variable, e.g., 8-step variable. Duplexer 318 sends, to demodulator 312, the signals received through radio channel 600 and antenna 200 and, to antenna 200, the signals from modulator 314 and power amplifier 316. Synthesizer 320 comprises a channel selection local oscillator and specifies a frequency in which signals are demodulated by demodulator 312 and a frequency in which signals are modulated by modulator 314.

Audio controller 330 comprises CPU 331, oscillator/frequency divider 332, address decoder 333, ROM 334, RAM 335, radio controller 336, audio circuit 337, control signal processor 338, audio controller 339, digital interface 340, power controller 341, and interrupt controller 342. Reference numeral 343 denotes an 8-bit data bus; 344, address bus; and 345, control bus. CPU 331 controls the operations of audio controller 330. Oscillator/frequency divider 332 supplies clock signals to CPU 331 and divides the clock signal so as to supply the frequency-divided pulses as timing pulses to each section of the mobile telephone apparatus. Address decoder 333 outputs predetermined operation signals to the components in response to instruction signals from CPU 331. ROM 334 stores various programs required for operations of CPU 331. RAM 335 stores various kinds of data during processing of CPU 331. For example, telephone dial numbers, the corresponding abbreviated numbers which are shorter than the telephone numbers in length, are stored in RAM 335. Radio controller 336 controls radio section 310 in response to an instruction from CPU 331. For example, radio controller 336 sends to synthesizer 320 signals indicative of a frequency available for the synthesizer 320, to power amplifier 316 signals indicative of an amplification available for power amplifier 316, and to modulator 314 signals indicative of parameters for modulation in modulator 314. Radio controller 336 receives a step-out signal from synthesizer 320 and output power detection signals from power amplifier 316 and supplies them to CPU 331, thereby preventing operation errors. Audio circuit 337 extracts control signals and audio signals from the received signals demodulated by demodulator 312 and supplies the control signals to control signal processor 338 and the audio signals to voice dial/response circuit 350 and telephone set 400. Audio circuit 337 also supplies, to modulator 314, the control signal from control signal processor 338 and audio signals from telephone set 400 and voice dial response circuit 350. It should be noted that audio circuit 337 also arranges the wave form of the control signal to be sent to control signal processor 338 in a certain wave form and filters the control signal to be supplied to modulator 314. Control signal processor 338 acquisites bit and frame synchronization with the control signal from audio circuit 337. Maintaining the acquisited synchronization, control signal processor 338 converts the serial control signals including control data received from a base station into parallel signals and converts the parallel control data signals to be transmitted to a base station into serial signals, which are sent to audio circuit 337. Audio controller 339 controls audio circuit 337. For example, under the control of audio controller 339, audio circuit 337 selectively applies the received signals from demodulator 312 to control signal processor 338, voice dial/response circuit 350, or handset unit 400 and selectively receives the signals from control signal processor 338, voice dial/response circuit 350, or handset unit 400. Digital interface 340 interfaces data communication between transceiver unit 300 and handset unit 400. Power controller 341 controls power source 390. For example, power controller 341 sets a voltage supplied from battery to power source 390 to a predetermined level. The voltage having the predetermined level is supplied to the respective components. Interrupt controller 342 interrupts CPU 331 in response to an interrupt signal from each component.

Figure 3:
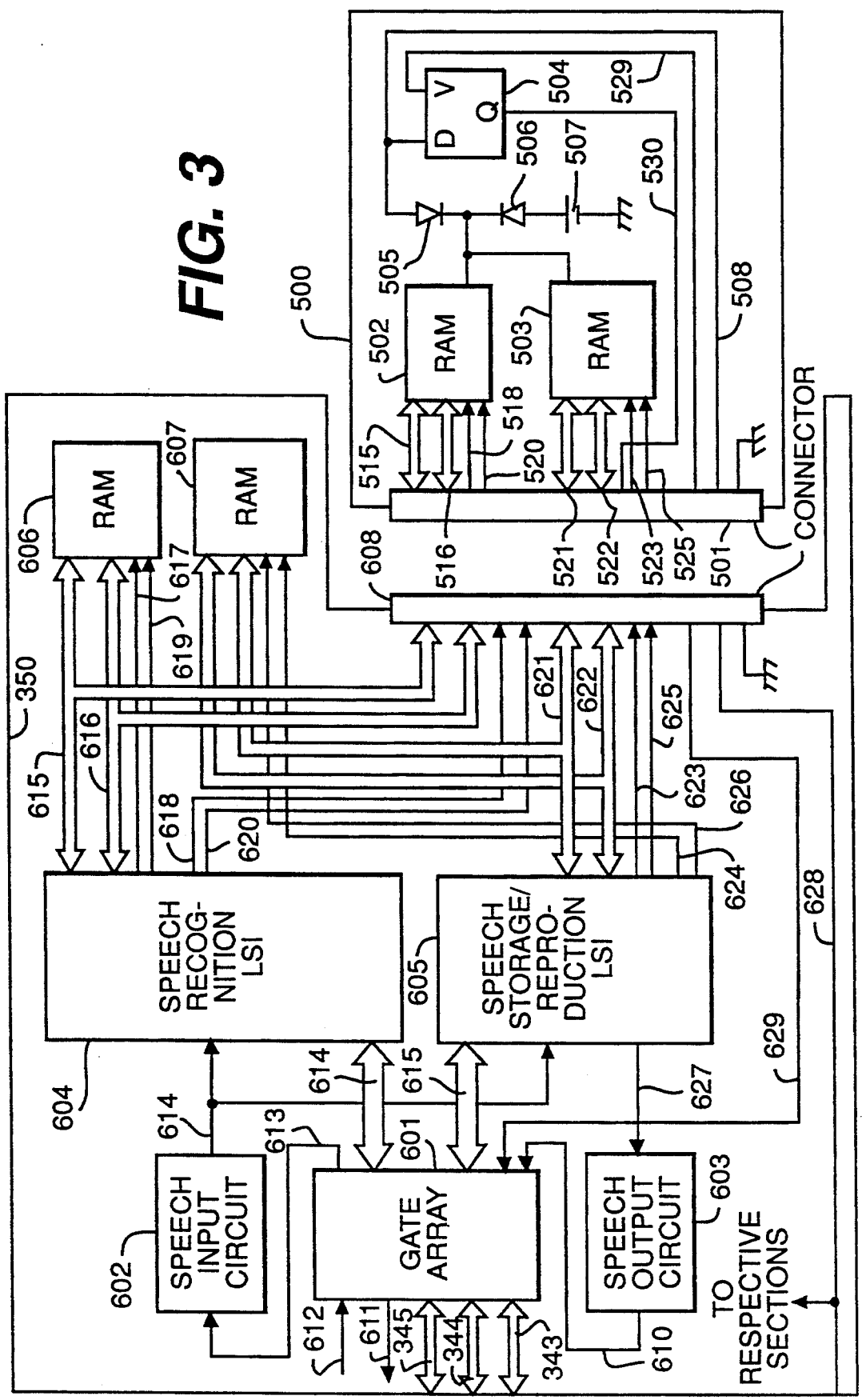
FIG. 3 is a block diagram of voice dial/response circuit 350 and IC card 500 shown in FIG. 1.

FIG. 3 is a block diagram showing details of voice dial/response circuit 350 and IC card 500.

The voice dial/response circuit 350 includes a gate array 601, a speech input circuit 602, a speech output circuit 603, a speech recognition LSI (Large Scale Integrated Circuit) 604, a speech storage/reproduction LSI 605, RAMs (Random Access Memories), and a connector 608.

The gate array 601 works as an interface between voice dial/response circuit 350 and transceiver controller 330. To CPU 331, the gate array 601 is connected via data bus 343, address bus 343, and control bus 345. The gate array 601 receives audio signals from speech output circuit 603 via an audio line 610 and transmits the audio signals to audio circuit 337 via an audio line 611. Also the gate array 601 receives audio signals from audio circuit 337 via an audio line 612 and transmits the audio signals to speech input circuit 602 via an audio line 613. Also, the gate array 601 sends control signals to speech recognition LSI 604 and speech storage/reproduction LSI 605 via control lines 614 and 615 and receive control signals from speech recognition LSI and speech storage/reproduction LSI 605 via control lines 614 and 615.

The speech input circuit 602 comprises a filter, an amplifier, level control circuit and so on, which are not shown in the drawing. The output of speech input circuit 602 is applied to speech recognition LSI 604 and speech storage/reproduction LSI 605 via an audio line 614.

The speech recognition LSI 604 converts the applied analog speech input into a digital speech pattern and extracts feature parameters from the digital speech pattern. In a registration mode, the extracted feature parameters are stored with a corresponding registration number into RAM 606 or, in the event that connector 501 is connected to connector 608, i.e., IC card 500 is inserted into transceiver unit 300, RAM 502 using address bus 615, data bus 616, read/write lines 617 and 618, and chip enabling lines 619 and 620. Similarly, in a recognition mode, speech recognition LSI 604 reads out the feature parameters stored in RAM 606 or RAM 502 and compares them with feature parameters extracted from newly input speech.

In RAM 606, as mentioned above, a plural sets of feature parameters extracted from speech patterns, which are used for speech recognition when IC card 500 is not inserted into transceiver unit 300, are stored.

The speech storage/reproduction LSI 605 converts the applied analog speech signal into a digital speech signal. In this conversion processing, a sampling rate, at which the analog speech signal is digitized, is selected so that the analog speech signal is reproduced on the basis of the digital speech signal.

In the registration mode, the digital speech signal is stored with a corresponding registration number into RAM 607 or, in the event that IC card 500 is inserted into transceiver unit 300, RAM 503 using address bus 621, data bus 622, read/write lines 623 and 624, and chip enabling line 625 and 626. When the stored digital speech signals are required to be read from RAM 607 or 503, speech storage/reproduction LSI 605 retrieved the required digital speech signal by designating a registration number corresponding to the digital speech signal, reproduces a analog speech signal on the basis of the retrieved digital speech signal, and transmit the reproduced signal to speech output circuit 603 via an audio line 627. The reproduction signal is amplified in speech output circuit 603 and transmitted to gate array 601 via audio line 610.

In RAM 607, a plural sets of digital speech signals, on the basis of which analog speech signals may be reproduced when IC card 500 is not inserted into transceiver unit 300, are stored.

The IC card 500 comprises RAMs 502 and 503, a latch 504, diodes 505 and 506, and a battery 507. RAMs 502 and 503 are powered by battery 507, which output voltage is 3 V, when IC card is not inserted into transceiver unit 300. Upon a connection with transceiver unit 300, a power supply line 508 gets connected with a power supply line 628 in transceiver unit 300 and supplies 5V power. Since diodes 505 and 507 are connected face to face, RAMs 502 and 503 are now supplied power from transceiver unit 300 via power supply line 508. Also, latch 504 and other parts may be powered via power supply line 508.

A plural sets of the feature parameters for speech recognition may be stored in RAM 502 as well as RAM 606. Also, a plural sets of digital speech signals for speech reproduction may be stored in RAM 503 as well as RAM 607. When IC card is inserted into transceiver unit 300, RAM 502 is connected to speech recognition LSI 604 via address bus 515 and 615, data bus 516 and 616, read/write lines 518 and 618, and chip enabling lines 520 and 620 through connectors 501 and 608. Also, RAM 503 is connected to speech storage/reproduction LSI 605 via address bus 521 and 621, data bus 522 and 622, read/write lines 523 and 623, and chip enabling lines 525 and 625 through connectors 501 and 608.

When IC card 500 is connected to transceiver unit 300, latch 504 outputs logic high level signal in response to a chip select signal from CPU 331 via control lines 629 and 529. A signal line 530 on which the output of latch 504 is placed is connected to one line of data bus 523, e.g., DO. Accordingly, CPU 331 may detect whether IC card 500 is connected to transceiver unit 300 by sending the chip select signal for selecting latch 504 and checking the output of data bus 622. In this event, RAM 607 and 503 are set to be disabled by chip enabling lines 625 and 626 under control of CPU 331.

Operations of mobile telephone apparatus 100 having the above arrangement will be described in detail with reference to the flow charts.

Figure 4:
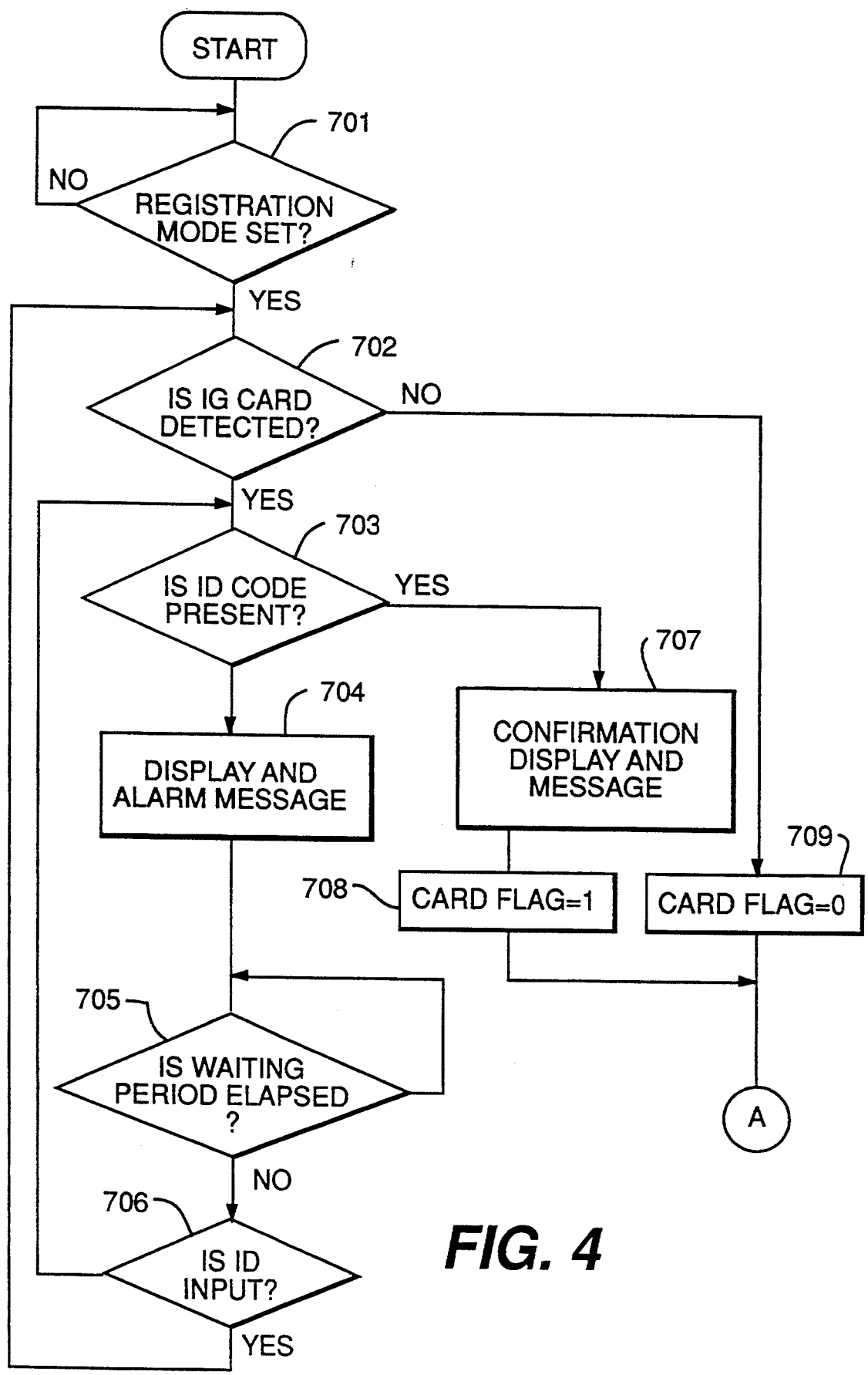
FIG. 4 and 5 are flow charts illustrating the registration operation of the telephone apparatus shown in FIG. 1.
Figure 5:
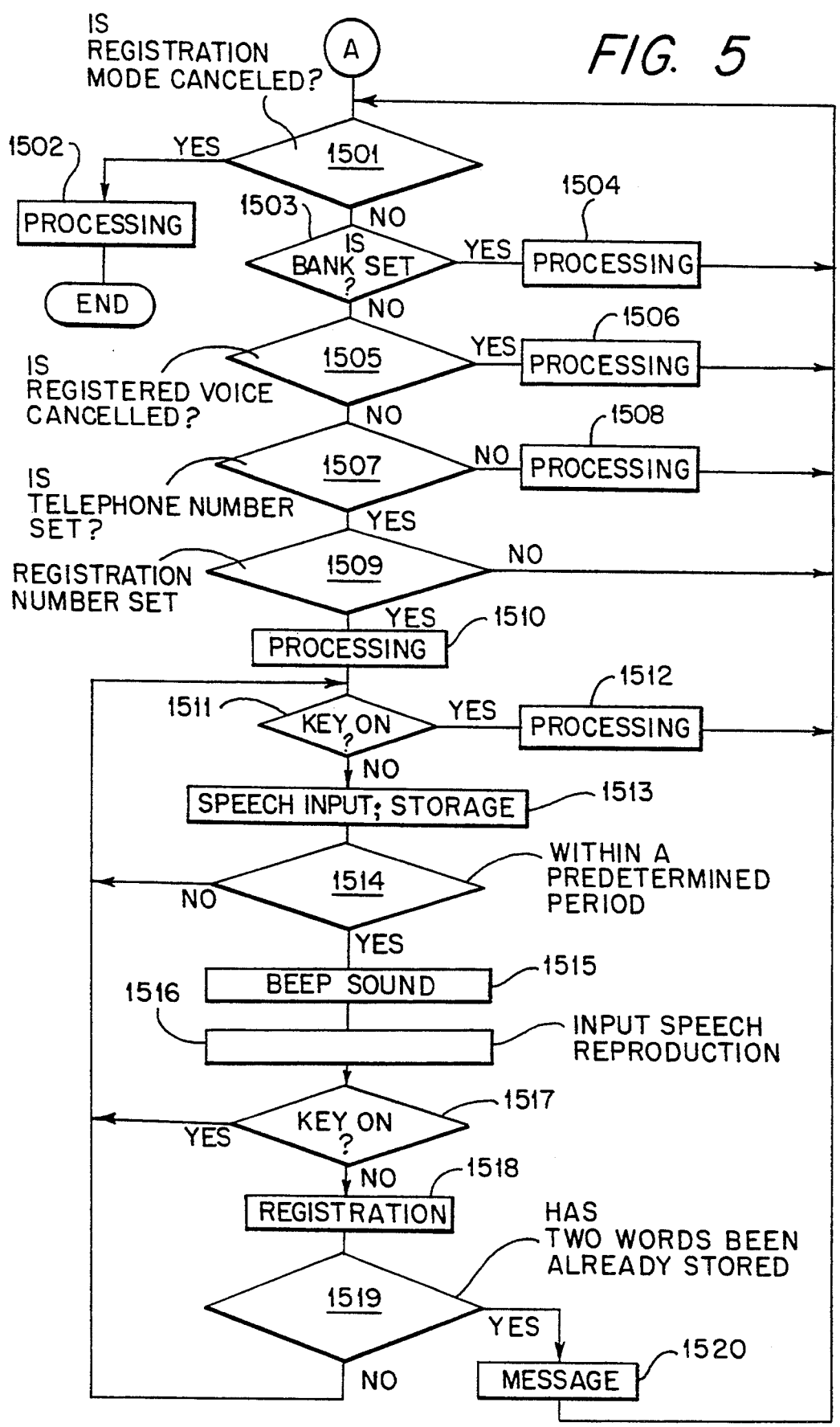

FIG. 4 and 5 are flow charts showing a registration operation. The registration operation will be described below with reference to the flow charts.

Operations may enter a registration mode from a standby state by predetermined key operations at the key unit 430 (step 701). For example, the user depresses the "CLR", "X", "Y", "Z", "FUNC", "#", and "5" keys to set the registration mode. "X", "Y", and "Z" constitute an unlocking code, i.e., a personal identification code registered by the user or the like. The unlocking code prevents registration by unauthorized user and damage to the registered data.

When the registration mode is set, the primary function as a telephone function of mobile telephone apparatus 100 is temporarily interrupted. In other words, an incoming call cannot be received by mobile telephone apparatus 100, and an outgoing call cannot be made thereat. Therefore, registration operations are not interrupted by an incoming call or an call organization, and an accurate registration may be performed.

Upon a set to the registration mode, CPU 331 sends the chip select signal for selecting latch 504 via control bus 345, gate array 601, and control lines 629 and 529. Responsive to the chip select signal, the state of Do line of data bus 622 is set to logic high state, if the ID card is inserted into the mobile telephone. Otherwise, the state of data bus 622 remain logic low state because the line is pull down to the ground via a resistor. CPU 331 detects the presence or absence of the IC card 500 connected to transceiver unit 300 by checking the Do output of data bus 345 (step 702).

In the event that the presence of IC card 500 is detected, CPU 331 determines whether the IC card stores it's own identification information by checking ID-flag area therein. CPU 331 performs this process by sending control signals to speech recognition LSI 604. The speech recognition LSI 604 enables RAM 502 and reads out a content in a predetermined area, i.e, ID flag area, which address is F000 while disabling RAM 606. The speech recognition LSI 604 sends back the content to CPU 331. CPU 331 determines if the IC card store identification information by checking the content (step 703).

In the event that the IC card doesn't store any information, i.e., the content is "0", CPU 331 sends control signals to handset controller 410 via digital interface 340 so that a message representing no identification information in the IC card, e.g., "NO-ID" is displayed on display unit 450 (step 703). Still, in step 703, CPU 331 activates speech storage/reproduction LSI 605 so that a predetermined speech message representing no identification information in the IC card and requesting a user to enter identification information, e.g., "ID is not registered in this card. Please enter ID code by pressing keys or speak ID voice in ten seconds period after this message" is read from RAM 503. This speech message is stored in a predetermined area, which address here is E000, of RAM 503 and read out by speech storage/reproduction LSI 605. The storage/reproduction LSI 605 reproduces an analog signal corresponding to the message and transmits it to audio circuit 337 through gate array 601. CPU 331 controls audio circuit 337 and hands-free circuit 380 so that an audio signal path to loud speaker 384 is established, thereby audible sound corresponding to the analog signal may be generated from loud speaker 384.

CPU 331 waits key input or utterance by the user for the waiting period, e.g., ten seconds. During the waiting period, key unit 430 stores input key information and speech storage/reproduction LSI 605 monitors audio signal received through hands-free microphone 382 and stores a digital speech signal corresponding to the audio signal if the level of the audio signal is more than a predetermined signal level. This signal level detection may be performed in speech input circuit 602. The input key information or the digital speech signal, if any, is stored into a predetermined area in RAM 503, i.e., identification information area, by speech storage/reproduction LSI 605 under a control of CPU 331. When the waiting period is elapsed (step 705), CPU 331 determines whether any ID code is input and whether any ID voice is input by checking the presence of identification information stored in the identification information area of RAM 503 (step 706).

When neither of ID code nor ID voice is detected in the identification information area, the operation of CPU 331 returns to step 702. In the event that either of ID code or ID voice is detected after the content of ID-flag area in RAM 502 is changed to "1" from "0" by speech recognition LSI 604 under the control CPU 331, the operation returns to step 703 and the presence of identification information is checked again there.

In step 703, when CPU 331 determines that IC card has identification information by checking ID flag area, CPU 331 reads ID code from ID information area of RAM 503 through speech/reproduction LSI 605 and sends control signals to handset controller 410 via digital interface 340 so that a message corresponding to the ID code is displayed on display unit. For ID voice, CPU 331 activates speech/reproduction LSI 605 so as to reproduce an analog signal corresponding to the digital speech signal of the ID voice and transmit it to audio circuit 337 through gate array 601. CPU 331 controls audio circuit 337 and hands-free circuit 380 so that an audio signal path to a loud speaker 384 is established, thereby audible sound corresponding to the ID voice may be produced from loud speaker 384. Thus, at least either one of ID code or ID voice may be indicated to a user of the telephone (step 707).

If the user enters "1", "2", "3", "4" as a ID code by pressing ten keys and speaks his name, "John" during the waiting period in the ID registration (step 705), on display unit 450 "1 2 3 4" is displayed and a voice of "John" is reproduced from loud speaker 384 each time the IC card is inserted into the telephone. Thereby, the user may confirm that the card is his and identify the contents stored in the card.

The operation proceeds to step 1501 shown in FIG. 5 after card flag in CPU 331 is set to "1" (step 708). Also, in the event that the presence of the IC card is not detected (step 702), the operation proceeds to step 1603 shown in FIG. 5 after card flag in CPU 331 is set to "0" (step 709).

In the speech registration processing described below, CPU 331 checks the card flag each time CPU 331 controls speech recognition LSI 604 and speech storage/reproduction LSI 605. CPU 331 controls speech recognition LSI 604 and speech storage/reproduction LSI 605 so as to access RAM 502 and 503 when the card flag is "1" and RAM 606 and 607 when the card flag is "0".

CPU 331 checks whether the registration mode is canceled (step 1501). This can be achieved by predetermined key operations at the key unit 430. For example, in order to cancel the registration mode, the "FUNC" and "CLR" keys are depressed (step 1502). If the registration mode is not cancelled, this mode is continuously set.

CPU 331 checks whether a "bank" function is set or not in the registration mode (step 1503). This setting can be performed by predetermined key operations at key unit 430. For example, the "bank" is set by depressing the "RCL", "#", and "X" keys (step 1504). In this case the "X" key is the "1" or "2" key. It should be noted that "bank" setting indicates that data to be registered (i.e., telephone numbers) may be divided into a plurality of groups and voice recognition in voice dialing may be performed in units of groups (banks). If "X" is "1" in "bank" setting, registration is performed by "bank 1". However, if "X" is "2", recognition is performed in "bank 2". In voice recognition, when "bank 1" is designated, voice recognition is performed on the basis of data registered in only "bank 1". However, if "bank 2" is designated, voice recognition is performed on the basis of data registered in only "bank 2". With performing such bank setting, voice dialing can be performed on the data registered by a plurality of voices and a plurality of users in one mobile telephone apparatus 1001. Therefore, voice dialing can be performed quickly and accurately. Alternatively, a single user may use "banks" according to predetermined conditions, e.g., business/private banks, thereby improving convenience in voice dialing.

CPU 331 then checks whether the registered data of the other party subjected to voice dialing is to be cancelled by monitoring cancel key operation at key unit 430 (step 1505). If cancel key is not operated, cancelling is not performed. In order to perform such cancelling, the mobile telephone apparatus 100 is set in the entire cancel mode or in the individual cancel mode. The entire cancel mode is set upon sequential depression of the "STO", "#", and "0" keys. In the entire cancel mode, all data of the parties to be calling by voice dialing, that is, telephone number data and corresponding to registered voice data are cancelled (erased). Therefore, data prior to entire cancelling is not left in the "banks" by entire cancelling, thus preventing dialing errors caused by data left unerased in the "bank". The individual cancel mode is set upon sequential depression of the "STO", "X" and "Y" keys. "X" and "Y" are registration address data assigned to the parties subjected to voice dialing. A registered telephone number which is rarely used or unnecessary can be erased individually.

A telephone number of a party subjected to voice dialing is set (step 1507). This can be performed by predetermining key operations at the key unit 430 (step 1508). For example, the telephone number is inputted by depressing the numerical keys, i.e., the "0" to "9" keys. The input telephone number is displayed on display unit 450, checked by the user, and transmitted to CPU 331 through handset controller 410.

A registration number for the telephone number set as described above is set (step 1509). This may be performed by predetermined key operations at key unit 430 (step 1510). For example, the user sequentially depress the "STO", "X", and "Y" represent registration addresses indicated by the "0" to "9" keys. The input registration number is also displayed on display unit 450, checked by the user, and transmitted to CPU 331 through handset controller 410. When the registration address has been set, a predetermined tone is outputted from loudspeaker 384. The user may know that a two-digit address corresponding to a 9-digit telephone number has been registered.

CPU 331 controls speech recognition LSI 604 so that the input telephone dial number and the corresponding registration number are stored in RAM 606 (if card flag is zero) or RAM 502 (if card flag is one).

After the predetermined tone is produced, the user speaks the name, the company name, or the like of the party corresponding to the telephone number set as described above. In this case, when the user depresses one of the keys in key unit 430 (step 1511), operations return to the registration mode setting state (steps 1512 and 1502). Even when the user utters wrong words, the initial state for registration mode setting may be set upon depression of any key for a predetermined period of time or more (e.g., one second or more).

The speech uttered by the user is received at microphone 382 or mouth piece 470 and transmitted to speech recognition LSI 604 and speech storage/reproduction LSI 605 via an audio line established under the control of CPU 331. The speech recognition LSI 604 extracts a set of feature parameters from the input speech signal and stores them into a location next to the location where the corresponding telephone number and registration number are stored in RAM 606 (if card flag is zero) or RAM 502 (if card flag is one). The speech storage/reproduction LSI 605 converts the input speech signal into a digital speech signal and stores it with the corresponding registration number into RAM 607 (if card flag is zero) or RAM 503 (if card flag is one).

When the first utterance of the user is made, e.g., when the user utters "office", the beep tone is generated twice if the utterance time falls within a predetermined period (e.g., one second) (step 1514 and 1515). Generation of two succeeding beep tones indicates that the first user utterance has been accepted. Next, the user spoken word stored in RAM 607 (card flag="0") or RAM 503 (card flag="1") is reproduced by speech storage/reproduction LSI 605 (step 1516). Thereby the user may confirm that his utterances is accurately received by the apparatus for speech recognition. For example the level drop in the head or end portion of the user spoken word would be detected. In case that the user's utterance is not properly received, the user depresses one of the keys in the key unit 430 within a predetermined period. Upon depression of one key, operations return to step 1511 (step 1517). Otherwise the first user spoken word is registered (step 1518). Next the user makes the second utterance. The second utterance is also handled in the same manner as the first utterances. Upon the completion of registration of two words, a message "thank you" is sounded together with the synthesized voice sound corresponding to the telephone number set in step 1507 (step 1520). When one voice registration cycle is completed, the user depresses the "FUNC" and "CLR" keys to cancel the registration mode (step 1501). In this case, assume that the input level of the first utterance is different from that of the second utterance, and the resultant signals having the different levels are used as speech data to be registered. And the user may confirm that 2 words were accurately stored.

Figure 6:
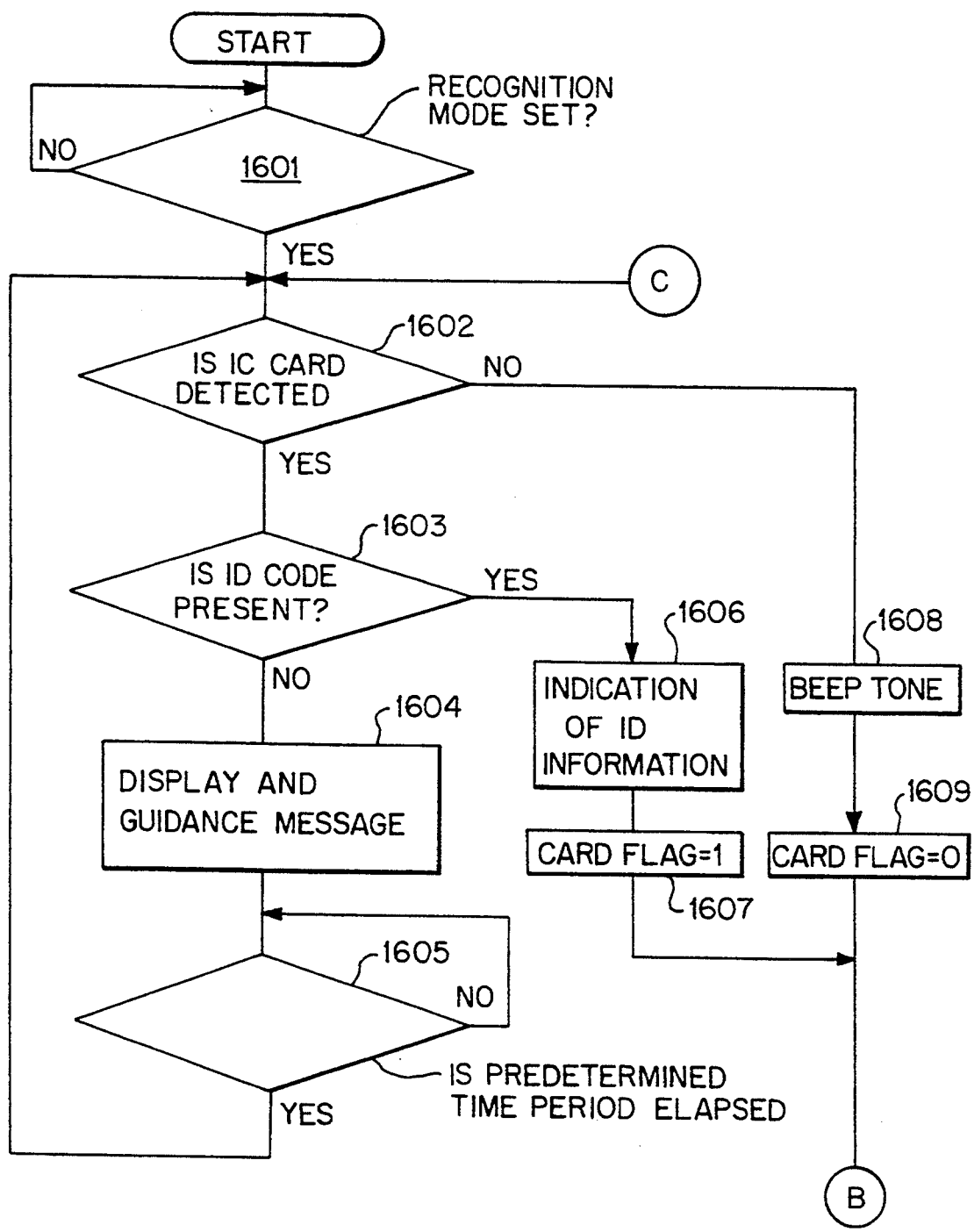
FIG. 6 and 7 are flow charts illustrating the recognition operation of the telephone apparatus shown in FIG. 1.

Next, voice activated dialing will be described with reference to a flow chart in FIGS. 6 and 7.

The recognition mode can be set by predetermined key operations at key unit 430 (step 1601). For example, the user depresses any one of the "0" to "9" keys at keys unit 430 for a predetermined period of time or more, e.g., one second or more.

Upon a set to the recognition mode, CPU 331 detects the presence or absence of the IC card 500 connected to transceiver unit 300 by checking the Do output of data bus 345 in the same manner as step 702 of registration operation shown in FIG. 4 (step 1602).

In the event that the presence of IC card 500 is detected, CPU 331 determines whether the IC card stores it's own identification information by checking ID-flag area therein in the same manner as step 703 of registration operation shown in FIG. 4 (step 1603).

In the event that the IC card doesn't store any identification information, i.e., the content of ID-flag is "0", CPU 331 sends control signals to handset controller 410 via digital interface 340 so that a message representing no identification information in the IC card, e.g., "NO-ID" is displayed on display unit 450 (step 1604). Still, in step 1604, CPU 331 activates speech storage/reproduction LSI 605 so that a predetermined speech message representing no identification information in the IC card and requesting a user to enter identification information in the registration mode, e.g., "ID is not registered in this card. Please set registration mode and input ID code or ID voice" is read from RAM 503. This speech message is stored in a predetermined area, which address here is E800, of RAM 503 and read out by speech storage/reproduction LSI 605. The storage/reproduction of LSI 605 reproduces an analog signal corresponding to the message and transmits it to audio circuit 337 through gate array 601. CPU 331 controls audio circuit 337 and hands-free circuit 380 so that an audio signal path to loud speaker 384 is established, thereby audible sound corresponding to the analog signal may be generated from loud speaker 384.

After that, CPU 331 waits for a predetermined time period, e.g. 10 seconds (step 1605).

When the predetermined time period has elapsed, the operation of CPU 331 returns to step 1602.

In step 1603, when CPU 331 determines that IC card has identification information by checking ID flag area, CPU 331 reads ID code from ID information area of RAM 503 through speech/reproduction LSI 605 and sends control signals to handset controller 410 via digital interface 340 so that a message corresponding to the ID code is displayed on display unit. For ID voice, CPU 331 activates speech/reproduction LSI 605 so as to reproduce an analog signal corresponding to the digital speech signal of the ID voice and transmit it to audio circuit 337 through gate array 601. CPU 331 controls audio circuit 337 and hands-free circuit 380 so that an audio signal path to a loud speaker 384 is established, thereby audible sound corresponding to the ID voice may be produced from loud speaker 384. Thus, at least either one of ID code or ID voice may be indicated to a user of the telephone (step 1606).

Figure 7:
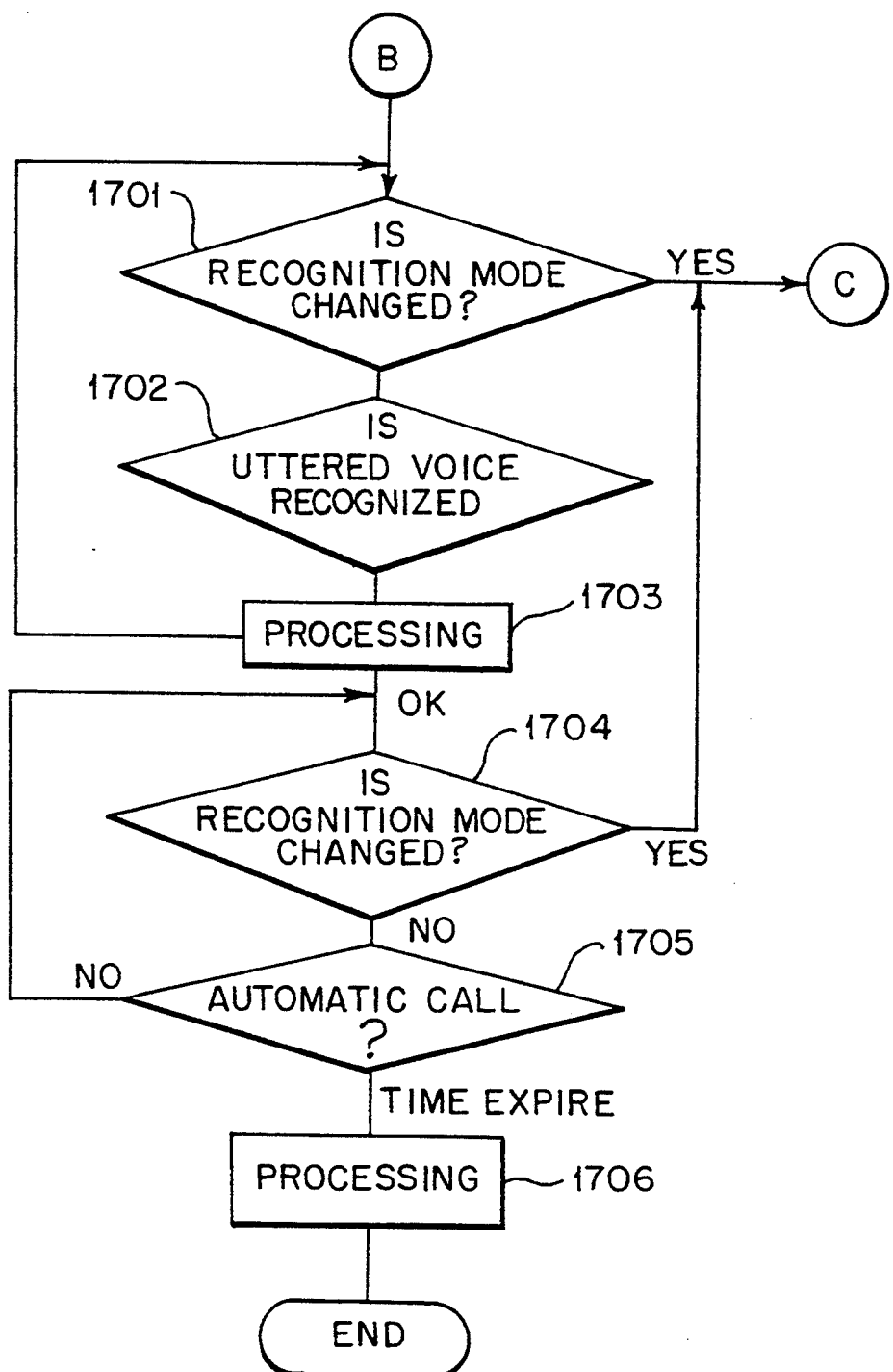

The operation proceeds to step 1701 shown in FIG. 7 after card flag in CPU is set to "1" (step 1607). Also, in the event that the presence of the IC card is not detected (step 1602), the operation proceeds to step 1701 shown in FIG. 7 after a beep time is generated (step 1608) and card flag in CPU 331 is set to "0" (step 1609).

In the voice activated dialing described below, CPU 331 checks the card flag each time CPU 331 controls speech recognition LSI 604. CPU 331 controls speech recognition 604 so as to access RAM 502 when the card flag is "1" and RAM 606 when the card flag is "0".

Thus, when the user sets the recognition mode, the user may confirm whose speech data will be used for the speech recognition. In step 1701 of FIG. 7 the user may reset the recognition mode. For example, the recognition mode is reset when any one of the "0" to "9" keys in the key unit 430 is kept depressed for a predetermined period of time or longer, e.g., one second or longer. More specifically, when one of the "0" to "9" keys is depressed for a predetermined period of time, all voice recognition results are invalidated, and a beep tone is produced at the loudspeaker 384 again. The recognition mode can be resumed even during voice recognition (step 1704). If the user utters wrong name or wishes to change the party to be called, the recognition mode can be reset and voice dialing can be resumed. The recognition mode can be canceled upon depression of one of the "0" to "9" keys within one second.

When the user utters a word or more, the uttered voice is recognized by speech recognition LSI 604 (step 1702), and the corresponding telephone number is retrieved from RAM 606 (if card flag is zero) or RAM 502 (if card flag is one) (step 1703). The retrieved telephone number is displayed on display unit 450. Therefore, the user can confirm the telephone number so that wrong call never be made.

When a predetermined period of time (e.g., three seconds) has elapsed after the telephone number is signalled to the user from display unit 450 or loudspeaker 384, a call for the accessed telephone number is automatically performed (steps 1705 and 1706). More specifically, mobile telephone apparatus 100 determines that the user wishes to make a call and seizes a channel through which a call signal is to be sent. After the user's will for making a call is confirmed, a call signal including at least the telephone dial number information recognized by voice dial/response circuit 350 through this channel is sent. If the telephone dial number information signalled to the user does not represent the desired telephone number, the recognition mode is reset or canceled upon depression of a predetermined numerical key for a predetermined period of time. Alternatively, the user depresses the "END" key to cancel the call. In this case, the call interruption signal is generated.

The registration numbers stored in RAM 606 or RAM 502 may be used as abbreviated numbers for repertory dialing function. For repertory dialing, a user is required to enter a function key, e.g. "RCL" followed by 2 digits numeral, which is the abbreviated number. Responsive to input of the function key, CPU 331 checks the presence of ID card and ID information in the ID card and indicates the result of check to the user in the same manner as the registration or recognition operation shown in FIG. 4 or 6. When an ID card coupled to the telephone is detected, a telephone number corresponding to the input abbreviated number (registration number) is retrieved from RAM 502 in IC card 500. Otherwise, it is retrieved from RAM 606 in transceiver unit.

The personal identification information for speech charge (speech charge ID) may be stored in the IC card. When a user make a call coupling the user's IC card to the telephone, CPU 331 reads out the speech charge ID and transmits the speech charge ID to a base station or an exchange office. Thus, the base station or the exchange office may charge on the transmitted speech charge ID but on the mobile ID or the terminal ID of the telephone. Also, this speech charge ID may be used as the ID code of the IC card mentioned above.

Still, various information may be stored in the IC card. For example, when a user make a call, CPU 331 may get the input telephone number for the call and speech time information relating to the call, and stores these information into the IC card. Also, when an incoming call is received, if the telephone obtains the telephone number of the calling party, the calling party's number may be stored in the IC card.

Furthermore, this invention is applicable to an automatic answering function or an incoming message storage function. The IC card may store various messages which are registered in advance by a user. The stored messages may be reproduced in response to an incoming call under a control of CPU 331. After that, CPU 331 may receive an incoming message which is uttered by the calling party and store it into the IC card.

Although an embodiment applied to a mobile telephone apparatus has been described, it is apparent to those skilled in this art that this invention may be applied to any kind of telecommunication apparatus, for example, to a telephone apparatus using land lines, cordless telephone, facsimile machine, or data transmission apparatus.

What is claimed:

1. A telecommunication apparatus used with a detachable memory device which is capable of storing personal information, the personal information being available for the apparatus when the detachable memory device is connected to the apparatus, comprising:

detecting means for detecting whether identification information is stored in the detachable memory device when the detachable memory device is connected to the apparatus;

indicating means, responsive to an absence of identification information, for providing an indication to a user of the apparatus; and storing means, responsive to the user's operation, for storing an identification information in said detachable memory device.

2. The apparatus according to claim 1 wherein said indicating means comprising alarming means for producing an audible speech signal indicative of the absence of identification information.

3. The apparatus according to claim 2 wherein said alarming means produces the audible signal on the basis of data stored in the detachable memory device.

4. An telecommunication apparatus used with a detachable memory device which is capable of storing personal information, the personal information being available for the electronic apparatus when the detachable memory device is connected to the apparatus, comprising:

detecting means for detecting whether identification information is stored in the detachable memory device when the detachable memory device is connected to the apparatus;

indicating means, responsive to an absence of identification information, for providing an indication to a user of the apparatus; and input means for inputting an identification information in response to the user's operation; and control means, responsive to said input means, for controlling the detachable memory device so that the input identification information is stored in the detachable memory device as an identification information assigned to the detachable memory device.

5. The apparatus according to claim 4 wherein said indicating means comprises alarming means for producing an audible speech signal indicative of the absence of identification information.

6. The apparatus according to claim 5 wherein said alarming means produces the audible signal on the basis of data stored in the detachable memory device.

* * * * *